US012502891B2

(12) United States Patent
Nagashima et al.

(10) Patent No.: US 12,502,891 B2
(45) Date of Patent: Dec. 23, 2025

(54) LIQUID STORAGE CONTAINER AND LIQUID STORAGE CONTAINER SET

(71) Applicant: SEIKO EPSON CORPORATION, Tokyo (JP)

(72) Inventors: Takumi Nagashima, Matsumoto (JP); Yoshihiro Koizumi, Shiojiri (JP); Shun Oya, Kiso-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 173 days.

(21) Appl. No.: 18/381,831

(22) Filed: Oct. 19, 2023

(65) Prior Publication Data

US 2024/0131850 A1 Apr. 25, 2024
US 2024/0227406 A9 Jul. 11, 2024

(30) Foreign Application Priority Data

Oct. 20, 2022 (JP) ................................ 2022-168103

(51) Int. Cl.
*B41J 2/175* (2006.01)
*B41J 2/21* (2006.01)

(52) U.S. Cl.
CPC ......... *B41J 2/1752* (2013.01); *B41J 2/17526* (2013.01); *B41J 2/17543* (2013.01); *B41J 2/17553* (2013.01); *B41J 2/2103* (2013.01)

(58) Field of Classification Search
CPC .. B41J 2/1752; B41J 2/17526; B41J 2/17543; B41J 2/17553; B41J 2/2103; B41J 2/16517; B41J 2/17509; B41J 2/17513; B41J 2/17523; B41J 2/17546; B41J 2/1755; B41J 29/13; B41J 2/17503
USPC ........................................................... 347/86
See application file for complete search history.

(56) References Cited

U.S. PATENT DOCUMENTS

2004/0218024 A1* 11/2004 Hankins .............. B29C 65/1483 347/86
2005/0068351 A1* 3/2005 Katayama ............ B41J 2/17513 347/85
2009/0290001 A1* 11/2009 Domae ................ B41J 2/17553 347/85

FOREIGN PATENT DOCUMENTS

JP 2022-53794 A 4/2022

* cited by examiner

*Primary Examiner* — Jason S Uhlenhake
*Assistant Examiner* — Alexander D Shenderov
(74) *Attorney, Agent, or Firm* — Oliff PLC

(57) ABSTRACT

A liquid storage container includes: a liquid storage portion including a storage-portion outer shell for storing liquid inside; and an adapter including an adapter outer shell and an insertion opening that is formed in the adapter outer shell and into which a liquid introduction portion of a container attachment portion is inserted, the storage-portion outer shell has a first-type color in a degree that does not allow light to pass through the storage-portion outer shell, and the adapter outer shell has a second-type color having a color difference with respect to a color of the liquid larger than or equal to a threshold.

11 Claims, 6 Drawing Sheets

LIQUID STORAGE CONTAINER AND LIQUID STORAGE CONTAINER SET

The present application is based on, and claims priority from JP Application Serial Number 2022-168103, filed Oct. 20, 2022, the disclosure of which is hereby incorporated by reference herein in its entirety.

BACKGROUND

1. Technical Field

The present disclosure relates to a technology for liquid storage containers.

2. Related Art

A liquid storage container having a liquid storage portion for storing liquid and having an adapter is known. JP-A-2022-53794 is an example of the related art. The adapter has an insertion opening into which a liquid introduction portion of the printing apparatus is inserted.

In related technologies, there is a concern that the liquid stored in the liquid storage portion can deteriorate when exposed to light such as ultraviolet light or visible light. In addition, when the liquid in the liquid storage portion leaks and attaches to the adapter, it can cause problems whereby the liquid stains the user and other objects and the liquid introduction portion cannot be inserted smoothly into the insertion opening. Hence, the user needs to promptly notice when the liquid is attached to the adapter and wipe off the liquid. Accordingly, a technology that reduces a deterioration of the liquid stored in the liquid storage portion and that enables the user to easily notice attached liquid when the liquid is attached to the adapter is desired.

SUMMARY

A first aspect of the present disclosure provides a liquid storage container configured to be detachably attached to a container attachment portion of a printing apparatus. The liquid storage container includes: a liquid storage portion including a storage-portion outer shell for storing liquid inside; and an adapter including an adapter outer shell and an insertion opening that is formed in the adapter outer shell and into which a liquid introduction portion of the container attachment portion is inserted, wherein the storage-portion outer shell has a first-type color in a degree that does not allow light to pass through the storage-portion outer shell, and the adapter outer shell has a second-type color having a color difference with respect to a color of the liquid larger than or equal to a threshold.

A second aspect of the present disclosure provides a liquid storage container set including a plurality of liquid storage containers. Each of the liquid storage containers is configured to be detachably attached to a container attachment portion of a printing apparatus. Each of the liquid storage containers includes: a liquid storage portion including a storage-portion outer shell for storing liquid inside; and an adapter including an adapter outer shell and an insertion opening that is formed in the adapter outer shell and into which a liquid introduction portion of the container attachment portion is inserted, the storage-portion outer shell has a first-type color in a degree that does not allow light to pass through the storage-portion outer shell, the adapter outer shell has a second-type color having a color difference with respect to a color of the liquid larger than or equal to a threshold, and the first-type color is a same color for each of the liquid storage containers regardless of the color of the liquid stored in each of the liquid storage containers.

DESCRIPTION OF EMBODIMENTS

A. First Embodiment

A-1. Configuration of Printing System

Figure 1:
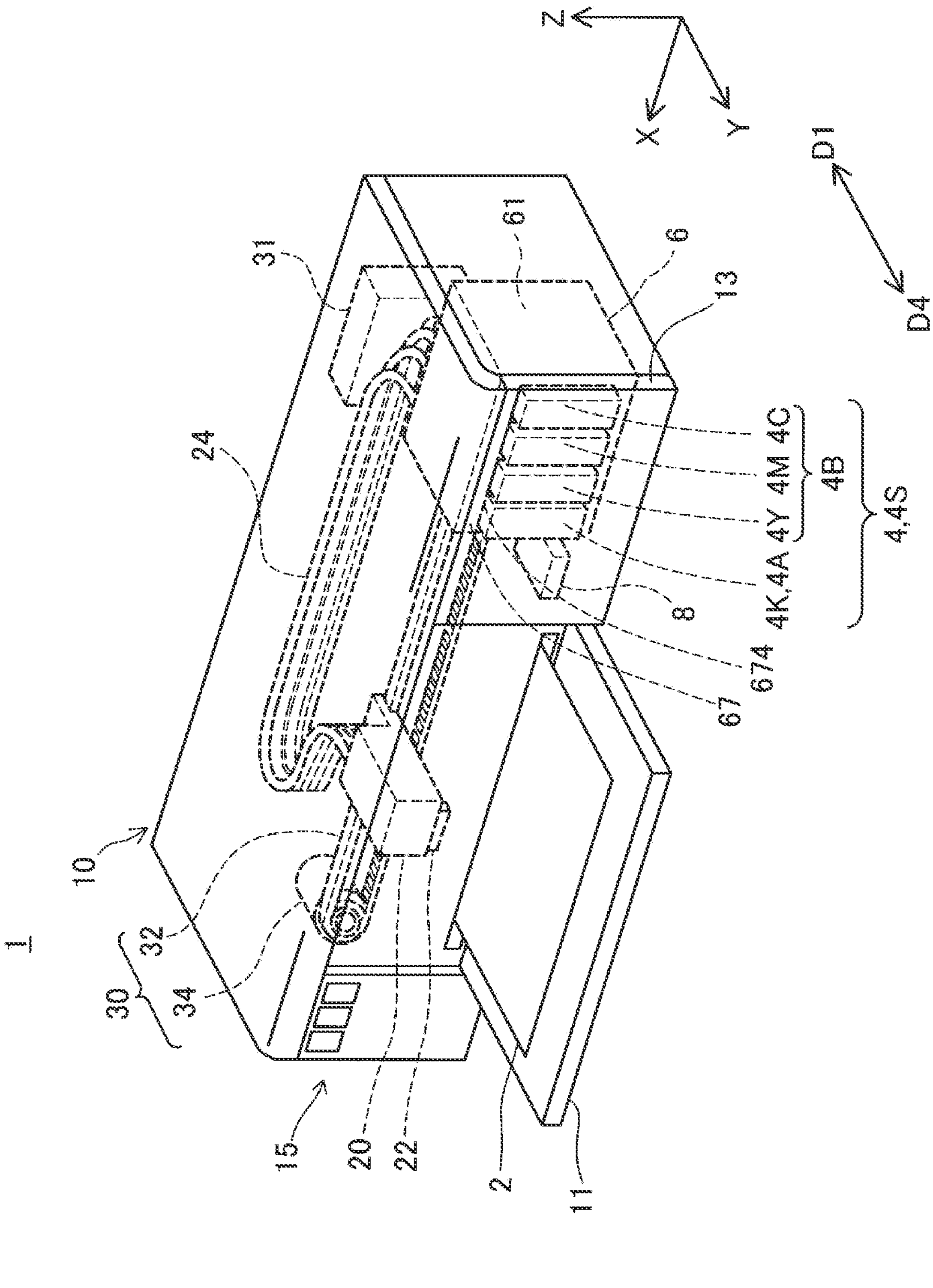
FIG. 1 is a perspective view of a printing system according to an embodiment of the present disclosure illustrating its configuration.

FIG. 1 is a perspective view of a printing system 1 according to an embodiment of the present disclosure illustrating its configuration. FIG. 1 illustrates the XYZ-axes which are three spatial axes orthogonal to one another. The directions in which the arrows of the X-axis, Y-axis, and Z-axis point are the positive directions of the X-axis, Y-axis, and Z-axis. The positive directions of the X-axis, Y-axis, and Z-axis are defined as the +X direction, +Y direction, and +Z direction, respectively. The directions opposite to the directions in which the arrows of the X-axis, Y-axis, and Z-axis point are the negative directions of the X-axis, Y-axis, and Z-axis, respectively. The negative directions of the X-axis, Y-axis, and Z-axis are defined as the −X direction, −Y direction, and −Z direction, respectively. The directions of the X-axis, Y-axis, or Z-axis when positive and negative directions are not relevant are simply referred to as the X direction, Y direction, or Z direction, respectively. The same is true of the figures and description that follow.

The printing system 1 includes a printing apparatus 10 and liquid storage containers 4 configured to supply ink, which is a liquid, to the printing apparatus 10.

The printing apparatus 10 of the present embodiment is an ink jet printer configured to eject ink, which is a liquid, from an ejecting head 22. The printing apparatus 10 is a large-format printer configured to perform printing on large-format sheets such as posters. The printing apparatus 10 includes a container attachment portion 6, a controller 31, a carriage 20, the ejecting head 22, and a driving mechanism 30. The printing apparatus 10 also includes operation buttons 15 for the user to operate the printing apparatus 10.

The container attachment portion 6 has a first apparatus wall 67 located on the +Y direction side. The first apparatus wall 67 has an insertion opening 674 that is the insertion opening to a storage chamber 61 for the liquid storage containers 4. Via the insertion opening 674, the liquid storage containers 4 are inserted to be stored in the storage chamber 61 of the container attachment portion 6, and the liquid storage containers 4 are removed from the storage chamber 61. The plurality of liquid storage containers 4 are separately detachably attached to the container attachment portion 6. In the present embodiment, a total of four liquid storage containers 4, one for each of four colors of ink, black, yellow, magenta, and cyan, are attached to the container attachment portion 6. A liquid storage container 4 that stores black ink is also referred to as a liquid storage container 4K, a liquid storage container 4 that stores yellow ink as a liquid storage container 4Y, a liquid storage container 4 that stores magenta ink as a liquid storage container 4M, and a liquid storage container 4 that stores cyan ink as a liquid storage container 4C. In the present embodiment, the liquid storage container 4K is configured to store a larger amount of liquid than the liquid storage containers 4C, 4M, and 4Y. Hence, the liquid storage container 4K is also referred to as a first-type liquid storage container 4A, and the liquid storage containers 4C, 4M, and 4Y are also referred to as second-type liquid storage containers 4B. In addition, the plurality of liquid storage containers 4K, 4C, 4M, and 4Y are also referred to as a liquid storage container set 4S.

The front face of the printing apparatus 10 on the +Y direction side includes a cover 13 that enables a user to perform a replacement operation. The cover 13 for the replacement operation is configured to open and close. Opening the cover 13 for the replacement operation exposes the opening of the container attachment portion 6, and liquid storage containers 4 can be attached or detached. When a liquid storage container 4 is attached to the container attachment portion 6, ink can be supplied via a tube 24, which is a liquid flow pipe, to the ejecting head 22 provided on the carriage 20. In the present embodiment, a water head difference is used to supply ink from the liquid storage container 4 to the ejecting head 22. Specifically, the water head difference between the liquid surface of the ink in the container attachment portion 6 and the ejecting head 22 causes ink to be supplied to the ejecting head 22. Note that in another embodiment, the ink in the liquid storage container 4 may be sucked by a pump mechanism (not illustrated) of the printing apparatus 10 to supply ink to the ejecting head 22. Note that the tube 24 is provided for each type of ink.

The ejecting head 22 has nozzles provided for each type of ink. The ejecting head 22 is configured to eject ink from the nozzles toward a printing sheet 2 to print data such as text and images. Note that the printing apparatus 10 in the present embodiment is a printer referred to as a so-called "off-carriage type" in which the container attachment portion 6 does not move in conjunction with the movement of the carriage 20. However, the technology in the present disclosure is applicable to a printer referred to as a so-called "on-carriage type" in which a carriage 20 has a container attachment portion 6 that moves together with the carriage 20.

The controller 31 is configured to control each unit in the printing apparatus 10 and send and receive signals to and from the liquid storage containers 4. The carriage 20 moves the ejecting head 22 relative to the printing sheet 2.

The driving mechanism 30 reciprocates the carriage 20 in accordance with control signals from the controller 31. The driving mechanism 30 includes a timing belt 32 and a drive motor 34. The power of the drive motor 34 is transferred to the carriage 20 via the timing belt 32 to reciprocate the carriage 20 in the main scanning direction, which is the X direction. The printing apparatus 10 includes a transportation mechanism for moving the printing sheet 2 in the sub-scanning direction, which is the +Y direction. During printing, the transportation mechanism moves the printing sheet 2 in the sub-scanning direction, and the printing sheet 2 on which printing is completed is output onto a front face cover 11.

An area referred to as a home position is provided at a position outside the print area to which the carriage 20 can be moved in the main scanning direction, and a maintenance mechanism that performs maintenance for proper execution of printing is disposed at the home position. The maintenance mechanism includes a cap member 8 configured to be pressed against the face having the nozzles on the bottom face side of the ejecting head 22 so as to surround the nozzles and form an enclosed space, an elevation mechanism (not illustrated) configured to move the cap member 8 up and down to press it against the nozzle face of the ejecting head 22, and a suction pump (not illustrated) configured to introduce a negative pressure to the enclosed space formed by the cap member 8 being pressed against the nozzle face of the ejecting head 22.

In the present embodiment, in the state in which the printing system 1 is being used, the axis in the sub-scanning direction in which a printing sheet 2 is transported is defined as the Y-axis, the axis in the direction of gravity as the Z-axis, and the axis in the movement direction of the carriage 20 as the X-axis. Here, "the state in which the printing system 1 is being used" denotes the state in which the printing system 1 is placed on a level surface. In the present embodiment, the sub-scanning direction is defined as the +Y direction, and the opposite direction is defined as the −Y direction. The direction of gravity is defined as the −Z direction, and the direction opposite to the direction of gravity is defined as the +Z direction. The X direction and the Y direction are horizontal directions. The direction from right to left when the printing system 1 is viewed from the front face is defined as the +X direction, and the opposite direction is defined as the −X direction. In the present embodiment, an insertion direction D1 in which a liquid storage container 4 is inserted into the container attachment portion 6 to be attached is the −Y direction, and a removal direction D4 in which a liquid storage container 4 is removed from the container attachment portion 6 is the +Y direction. Hence, in the container attachment portion 6, the −Y direction side is also referred to as the far side, and the +Y direction side is also referred to as the near side. In the present embodiment, the arrangement direction of the plurality of liquid storage containers 4 is the X direction.

A-2. Detailed Configuration of Container Attachment Portion

Figure 2:
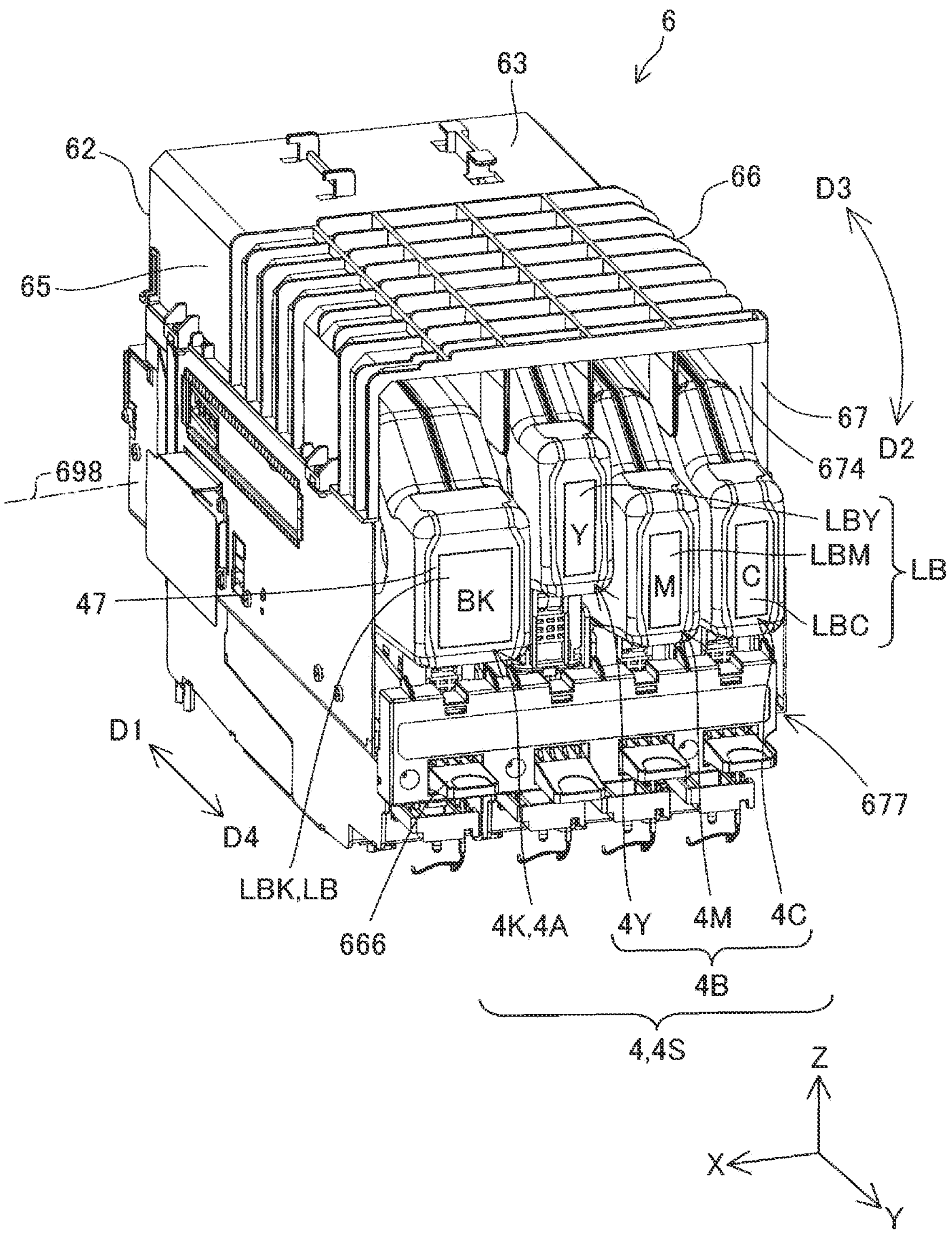
FIG. 2 is a first perspective view of a container attachment portion.
Figure 3:
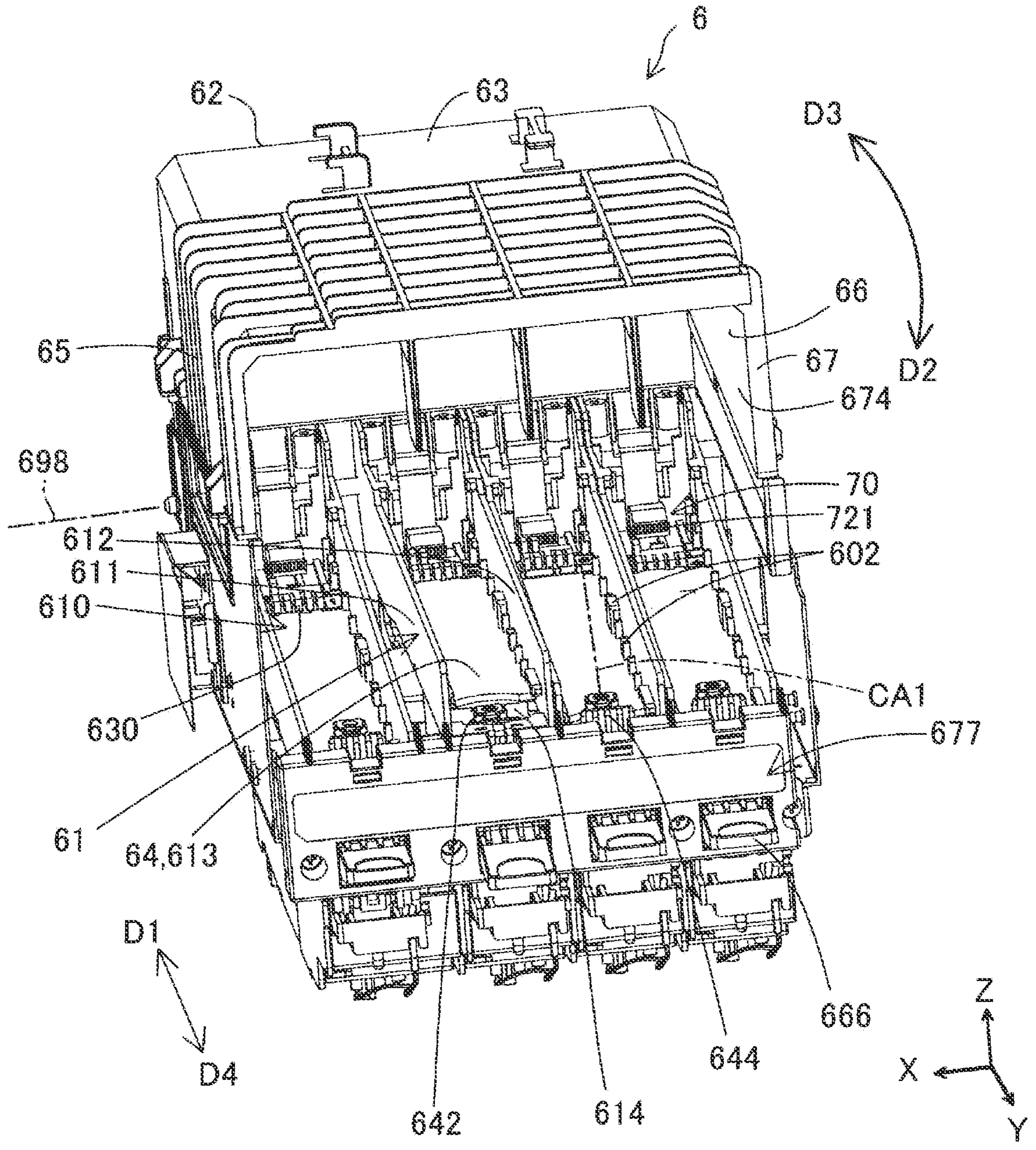
FIG. 3 is a second perspective view of the container attachment portion.

FIG. 2 is a first perspective view of the container attachment portion 6. FIG. 3 is a second perspective view of the container attachment portion 6. FIG. 2 illustrates the container attachment portion 6 with the plurality of liquid storage containers 4 inserted or attached. FIG. 3 is a view of the container attachment portion 6 with the liquid storage containers 4 omitted from the state illustrated in FIG. 2. In FIG. 2, the liquid storage containers 4K, 4M, and 4C are in an attached state in which they have been attached to the container attachment portion 6. In FIG. 2, the liquid storage container 4Y is in an inserted state in which it has been inserted into the container attachment portion 6. The attached state is a state in which adapter terminals (described later) of a liquid storage container 4 are in contact with apparatus-side terminals (described later) of the container attachment portion 6 and in which a liquid introduction portion (described later) of the container attachment portion 6 is coupled to a liquid supply portion of the liquid storage container 4. The inserted state is a state in which a liquid storage container 4 has been inserted into the container attachment portion 6 in the insertion direction D1, which is a horizontal direction. In the inserted state, the adapter terminals (described later) of the liquid storage container 4 are in contact with the apparatus-side terminals (described later) of the container attachment portion 6, but the liquid supply portion of the liquid storage container 4 is not coupled to the liquid introduction portion of the container attachment portion 6. To place a liquid storage container 4 into the attached state from the inserted state, a near-side portion of the liquid storage container 4 in the insertion direction D1 is rotated in a rotatory attachment direction D2 including a direction of gravity component. As described above, to attach a liquid storage container 4 to the container attachment portion 6, the liquid storage container 4 is inserted into the container attachment portion 6 in the insertion direction D1, which is a horizontal direction, and a near-side portion of the liquid storage container 4 in the insertion direction D1 is then moved in the rotatory attachment direction D2.

In the container attachment portion 6, the X direction is also referred to as the width direction, the Y direction as the depth direction, and the Z direction as the height direction. In the following, unless the state is specifically mentioned, each component is described with respect to the container attachment portion 6 in the inserted state. In the container attachment portion 6, the inserted state is the same as the initial state in which a liquid storage container 4 or an adapter of a liquid storage container 4 is not attached.

As illustrated in FIG. 3, the container attachment portion 6 has the storage chamber 61 in which the liquid storage containers 4 are stored. The storage chamber 61 has an approximately rectangular parallelepiped shape. The storage chamber 61 has slots configured to hold the respective liquid storage containers 4C, 4M, 4Y, and 4K. Each slot has a shape substantially conforming to the outer shape of the liquid storage container 4C, 4M, 4Y, or 4K.

As illustrated in FIG. 3, the container attachment portion 6 has six apparatus walls 62, 63, 64, 65, 66, and 67 which form the storage chamber 61. In the present disclosure, the concept of "wall" includes not only a single wall but also a wall composed of a plurality of walls. The first apparatus wall 67 has the insertion opening 674 through which liquid storage containers 4 pass when being inserted into or removed from the storage chamber 61. The second apparatus wall 62 is a wall on the −Y direction side of the storage chamber 61. The second apparatus wall 62 is opposed to the first apparatus wall 67 in the Y direction. The second apparatus wall 62 is a substantially vertical wall in the state in which the printing apparatus 10 is being used.

The apparatus upper wall 63 is a wall on the +Z direction side of the storage chamber 61. The apparatus bottom wall 64 is opposed to the apparatus upper wall 63 in the Z direction and is a wall on the −Z direction side of the storage chamber 61. The apparatus bottom wall 64 is composed of support members 610. The apparatus bottom wall 64 has a plurality of first apparatus openings 614. In the present embodiment, the number of the first apparatus openings 614 is four, corresponding to the number of the liquid storage containers 4 to be attached. The apparatus upper wall 63 and the apparatus bottom wall 64 intersect the second apparatus wall 62 and the first apparatus wall 67. In the present disclosure, "intersect" denotes one of the following states: state (i) in which two elements have directions intersecting each other and actually intersect each other, state (ii) in which if one of the elements is extended, it will intersect the other element, and state (iii) in which if both of the elements are extended, they will intersect each other.

The first apparatus side wall 65 is a wall on the +X direction side of the storage chamber 61. The second apparatus side wall 66 is opposed to the first apparatus side wall 65 in the X direction and is a wall on the −X direction side of the storage chamber 61. The first apparatus side wall 65 and the second apparatus side wall 66 intersect the second apparatus wall 62, the first apparatus wall 67, the apparatus upper wall 63, and the apparatus bottom wall 64.

As illustrated in FIG. 3, the container attachment portion 6 further includes apparatus-side terminal portions 70, apparatus guide portions 602, the support members 610, the liquid introduction portions 642, apparatus-side positioning portions 644, a fixation forming member 677, and apparatus-side identification members 630. The apparatus-side terminal portions 70, the apparatus guide portions 602, the liquid introduction portions 642, the apparatus-side positioning portions 644, the fixation forming member 677, and the apparatus-side identification members 630 are attachment-portion elements that work together with the liquid storage container 4.

The number of support members 610 corresponds to the number of liquid storage containers 4 to be attached. In the present embodiment, the number of support members 610 is four. The support members 610 constitute the apparatus bottom wall 64 on the direction of gravity side of the storage chamber 61. Each support member 610 supports a liquid storage container 4 from the −Z direction side, which is the direction of gravity side. The support member 610 is a member extending in the Y direction. The support member 610 has a recessed shape. The support member 610 has a main wall 613 which is part of the apparatus bottom wall 64, a first support side wall 611, and a second support side wall 612. The support member 610 is configured to rotate, in the rotatory attachment direction D2 including a component in the direction of gravity and in a release direction D3 including a component in the direction opposite to the direction of gravity, around a rotation axis 698 located at a position in the container attachment portion 6 on the far side in the insertion direction D1 and on the direction of gravity side. The release direction D3 is the direction opposite to the rotatory attachment direction D2.

The main wall 613 is a bottom portion of a recessed shape located on the direction of gravity side. The main wall 613 has a first apparatus opening 614. Each of the first apparatus opening 614 and a second apparatus opening 626 extends through the main wall 613 in the thickness direction of the main wall 613.

As illustrated in FIG. 3, the first support side wall 611 stands in the +Z direction, which is the direction opposite to the direction of gravity, from an end portion of the main wall 613 in the +X direction. The second support side wall 612 stands in the +Z direction from an end portion of the main wall 613 in the −X direction. The first support side wall 611 and the second support side wall 612 face each other in the X direction.

The apparatus guide portions 602 guide the liquid storage container 4 or the adapter of the liquid storage container 4 in the insertion direction D1 and in the removal direction D4. The apparatus guide portions 602 are provided for each support member 610. The apparatus guide portions 602 are provided for each of the first support side wall 611 and the second support side wall 612. The apparatus guide portions 602 are protrusions provided on the first support side wall 611 and the second support side wall 612. Two or more of these protrusions are arranged at intervals in the insertion direction D1.

As illustrated in FIG. 3, the liquid introduction portion 642 receives the liquid from the liquid storage container 4. The liquid introduction portion 642 has a center axis CA1. In the present embodiment, the center axis CA1 is inclined by 4° in the +Y direction with respect to the Z direction. In the inserted state, the liquid introduction portion 642 is not located in the storage chamber 61 but on the −Z direction side of the storage chamber 61. In other words, the liquid introduction portion 642 is located on the side of the support member 610 opposite to the storage chamber 61. When the support member 610 is rotated around the rotation axis 698 in the rotatory attachment direction D2, the first apparatus opening 614 is pushed down, and the distal end of the liquid introduction portion 642 is positioned in the storage chamber 61.

When the apparatus-side positioning portion 644 is received by a liquid-storage-container positioning portion (described later) of the liquid storage container 4, the apparatus-side positioning portion 644 restricts the movement of the adapter (described later) of the liquid storage container 4 relative to the liquid introduction portion 642. In the inserted state, the apparatus-side positioning portion 644 is not located in the storage chamber 61 but on the −Z direction side of the storage chamber 61. In other words, the apparatus-side positioning portion 644 is located on the side of the support member 610 opposite to the storage chamber 61. When the support member 610 is rotated around the rotation axis 698 in the rotatory attachment direction D2, the first apparatus opening 614 is pushed down, and the distal end of the apparatus-side positioning portion 644 is positioned in the storage chamber 61.

The apparatus-side terminal portion 70 has a plurality of apparatus-side terminals 721 configured to come into contact with liquid-storage-container terminals of the liquid storage container 4. The apparatus-side terminal portion 70 is provided at a position on the support member 610 on the −Y direction side, which is the far side in the insertion direction D1.

The fixation forming member 677 is located on the +Y direction side of the support member 610. The fixation forming member 677 is located on the −Z direction side of the insertion opening 674. The fixation forming member 677 has four attachment fixing portions (described later) corresponding to the respective slots of the storage chamber 61. Each attachment fixing portion is a protrusion configured to engage the adapter of the liquid storage container 4 to maintain an attached state in which the liquid storage container 4 is fixed so as not to move. As illustrated in FIG. 3, the fixation forming member 677 has releasing portions 666 corresponding to the respective attachment fixing portions, each releasing portion 666 being configured to move the attachment fixing portion to release the engagement with the adapter of the liquid storage container 4. The releasing portion 666 is a plate-shaped member and is coupled to the attachment fixing portion. When the releasing portion 666 is pushed down in the direction of gravity, the attachment fixing portion is moved in the release direction.

The apparatus-side identification member 630 consists of a plurality of ribs formed on the +Y direction side of the apparatus-side terminal portion 70. The apparatus-side identification member 630 is provided for each slot that holds the corresponding one of the liquid storage containers 4C, 4M, 4Y, and 4K in the container attachment portion 6, and each slot has a different shape determined by the number and the positions of the ribs.

A-3. Detailed Configuration of Liquid Storage Container

Figure 4:
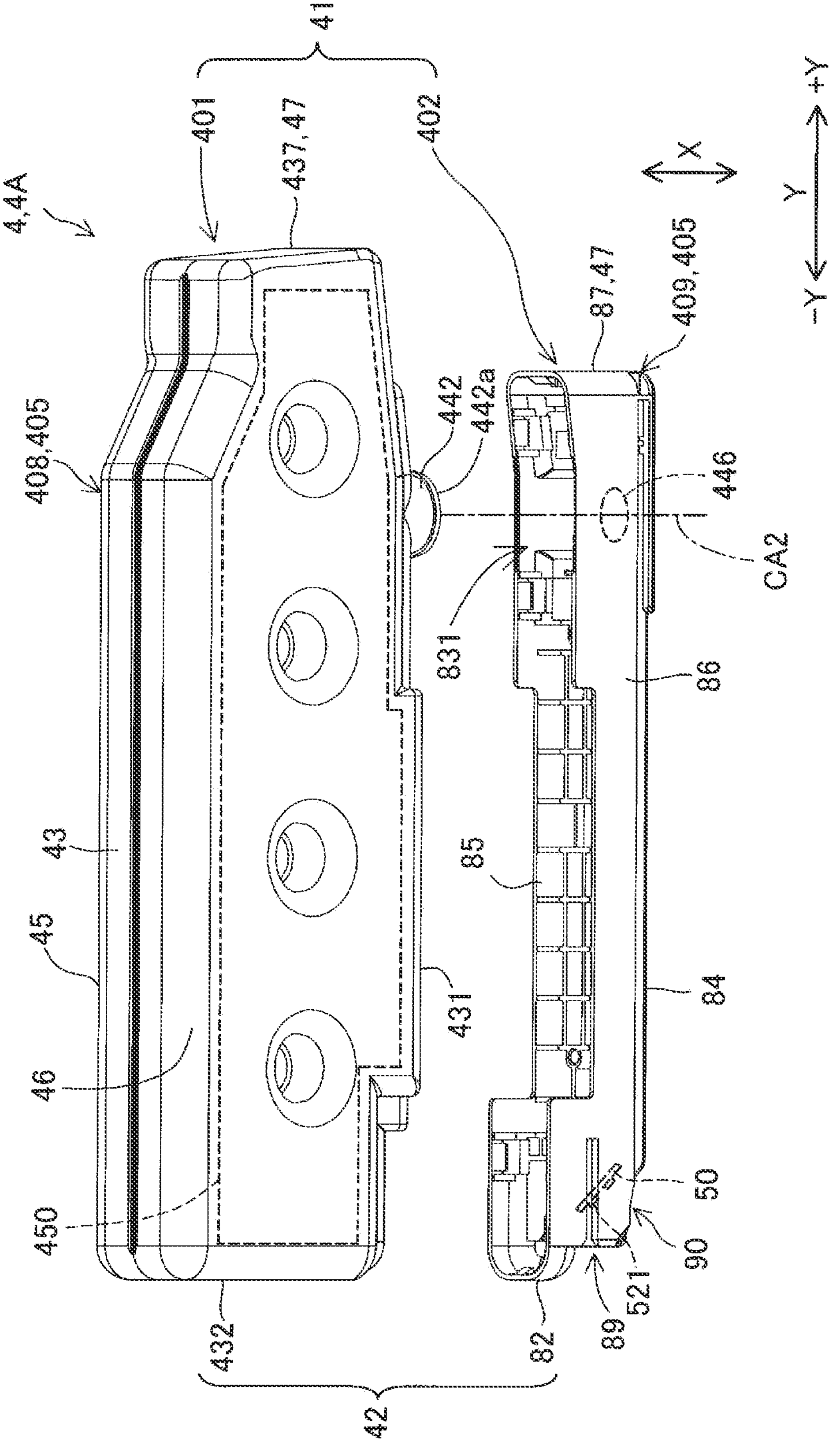
FIG. 4 is an exploded perspective view of a first-type liquid storage container.
Figure 5:
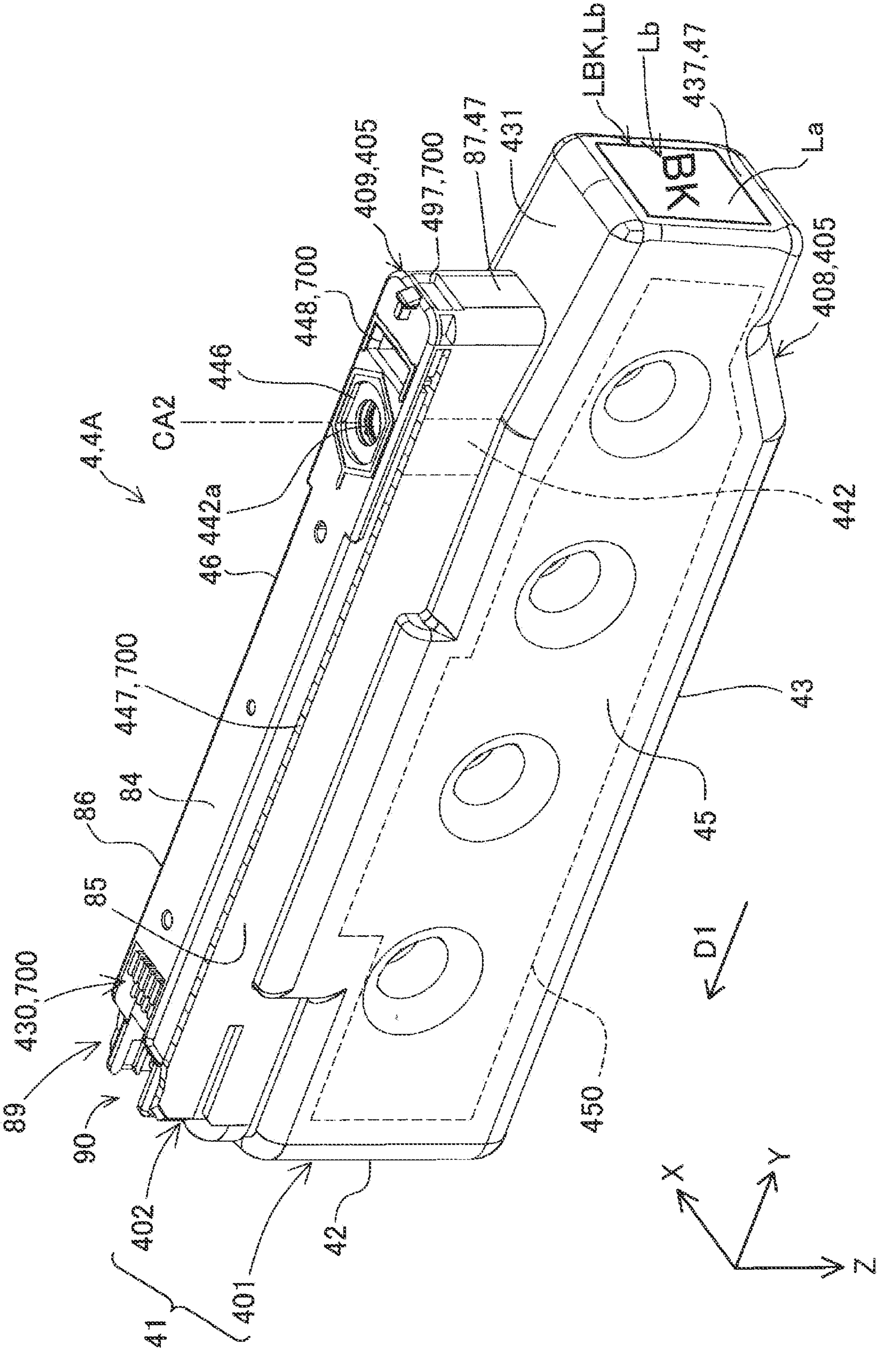
FIG. 5 is a perspective view of the first-type liquid storage container.

FIG. 4 is an exploded perspective view of the first-type liquid storage container 4A. FIG. 5 is a perspective view of the first-type liquid storage container 4A. The difference between the first-type liquid storage container 4A and the second-type liquid storage container 4B illustrated in FIG. 1 is the capacity of a liquid storage space 450. Specifically, a liquid storage portion 401 (described later) of the first-type liquid storage container 4A is wider than the liquid storage portion 401 of the second-type liquid storage container 4B, which causes the liquid storage space 450 to have a different capacity. The other features such as the adapter 402 are the same between the first-type liquid storage container 4A and the second-type liquid storage container 4B, and hence, in the following, the first-type liquid storage container 4A is used to describe a detailed configuration of the liquid storage container 4. Note that hereinafter, the first-type liquid storage container 4A is also simply referred to as the liquid storage container 4. The X direction, the Y direction, and the Z direction in the figures illustrating the liquid storage container 4 are based on the inserted state in which the liquid storage container 4 is completely inserted into the container attachment portion 6.

As illustrated in FIG. 5, the outer shape of the liquid storage container 4 is a substantially rectangular parallelepiped. In the liquid storage container 4, the −Y direction, which is the insertion direction of the container attachment portion 6, is the longitudinal direction, the X direction is the lateral direction, which is the width direction, and the Z direction is the height direction. In the liquid storage container 4, the dimension in the longitudinal direction is the largest, and the dimension in the lateral direction is the smallest.

The liquid storage container 4 includes a liquid-storage-container main body 41 and a circuit substrate 50 attached to the liquid-storage-container main body 41. In the present embodiment, the liquid-storage-container main body 41 includes two members as illustrated in FIG. 4. Specifically, the liquid-storage-container main body 41 includes the liquid storage portion 401 and the adapter 402 configured to be attached to the liquid storage portion 401 in a fitted manner.

Each of the liquid storage portion 401 and the adapter 402 is molded from a plastic such as polypropylene by, for example, injection molding. The liquid storage portion 401 and the adapter 402 may be formed of the same material or different materials.

As illustrated in FIG. 4, the liquid storage portion 401 includes a storage-portion outer shell 408 for storing liquid inside. The inside of the storage-portion outer shell 408 is the liquid storage space 450 configured to store liquid. The storage-portion outer shell 408 has a storage-portion front wall 432, a storage-portion rear wall 437, a storage-portion upper wall 43, a storage-portion bottom wall 431, a storage-portion first side wall 45, which is a side wall, and a storage-portion second side wall 46, which is a side wall. Each of the walls 432, 43, 431, 45, 46, and 437 is also referred to as a face 432, 43, 431, 45, 46, and 437, respectively. The storage-portion front wall 432, the storage-portion rear wall 437, the storage-portion upper wall 43, the storage-portion first side wall 45, and the storage-portion second side wall 46 serve as outer surfaces of the liquid storage container 4. Part of the storage-portion bottom wall 431 also serves as an outer surface of the liquid storage container 4.

The storage-portion front wall 432 and the storage-portion rear wall 437 are opposed to each other in the Y direction, which is the insertion direction. The storage-portion upper wall 43 and the storage-portion bottom wall 431 are opposed to each other in the Z direction. The Z direction is parallel to the center axis CA2 extending in the direction in which the liquid supply portion 442 extends. The storage-portion first side wall 45 and the storage-portion second side wall 46 are opposed to each other in the X direction.

The storage-portion front wall 432 is located on the insertion direction D1 side from which the liquid storage container 4 is inserted into the container attachment portion 6. In other words, the storage-portion front wall 432 serves as an insertion front end face on the −Y direction side, which is the insertion direction D1 side. The storage-portion rear wall 437 serves as the face on the +Y direction side, which is the removal direction side. The storage-portion upper wall 43 is located on the +Z direction side and intersects the storage-portion front wall 432 and the storage-portion rear wall 437. The storage-portion upper wall 43 serves as the upper wall of the liquid storage container 4. The storage-portion bottom wall 431 illustrated in FIG. 4 is located on the −Z direction side, which is the direction of gravity side in the attached state. The storage-portion bottom wall 431 intersects the storage-portion front wall 432 and the storage-portion rear wall 437.

The storage-portion first side wall 45 is located on the −X direction side, and the storage-portion second side wall 46 is located on the +X direction side. Each of the storage-portion first side wall 45 and the storage-portion second side wall 46 intersects the storage-portion front wall 432, the storage-portion rear wall 437, the storage-portion upper wall 43, and the storage-portion bottom wall 431. Each of the storage-portion first side wall 45 and the storage-portion second side wall 46 extends in the insertion direction D1.

As illustrated in FIG. 4, the liquid storage portion 401 further includes the liquid supply portion 442 protruding from the storage-portion bottom wall 431 of the storage-portion outer shell 408. The liquid supply portion 442 is a tubular member and communicates with the liquid storage space 450 which is an internal space for storing liquid in the liquid storage portion 401. The liquid supply portion 442 is coupled to the liquid introduction portion 642 in the attached state and supplies the liquid from the liquid storage space 450 to the ejecting head 22 of the printing apparatus 10 via the liquid introduction portion 642. The liquid supply portion 442 has a supply-portion distal end portion 442*a* which is the distal end portion having an opening through which liquid is lead to the outside.

As illustrated in FIGS. 4 and 5, the adapter 402 has an adapter outer shell 409 serving as outer surfaces of the liquid storage container 4, and an insertion opening 446 is formed in the adapter outer shell 409.

The adapter outer shell 409 has an adapter front wall 82, an adapter rear wall 87, an adapter bottom wall 84, a first adapter side wall 85, a second adapter side wall 86, and a corner portion 89. As with the front wall 42, the adapter front wall 82 serves as the insertion front end face on the −Y direction side, which is the insertion direction side. The adapter rear wall 87 and the adapter front wall 82 are opposed to each other in the Y direction. The adapter bottom wall 84 is the bottom face of the liquid storage container 4. The adapter bottom wall 84 intersects the adapter front wall 82 and the adapter rear wall 87. The adapter bottom wall 84 has the insertion opening 446 described above. In a view of the liquid storage container 4 from the adapter bottom wall 84 side, the insertion opening 446 and the liquid supply portion 442 overlap each other. In the present embodiment, the liquid supply portion 442 is located such that the center axis CA2 of the liquid supply portion 442 passes through the insertion opening 446.

The first adapter side wall 85 intersects the adapter bottom wall 84 and extends in the longitudinal direction of the adapter 402, in other words, in the insertion direction in which the liquid storage container 4 is inserted into the container attachment portion 6. The first adapter side wall 85 is a plate-shaped wall standing from the adapter bottom wall 84 toward the liquid storage portion 401. The second adapter side wall 86 is opposed to the first adapter side wall 85 in the X direction, which is the lateral direction of the adapter 402. The second adapter side wall 86 intersects the adapter bottom wall 84 and extends in the longitudinal direction of the adapter 402, in other words, in the insertion direction in which the liquid storage container 4 is inserted into the container attachment portion 6. The second adapter side wall 86 is a plate-shaped wall standing from the adapter bottom wall 84 toward the liquid storage portion 401.

The adapter 402 has a recessed shape the bottom of which is the adapter bottom wall 84. The face of the adapter 402 opposed to the adapter bottom wall 84 is open, and the liquid supply portion 442 is placed inside the adapter 402 via this opening. A portion of the adapter 402 in which the liquid supply portion 442 is placed is also referred to as a supply-portion placement portion 831.

The corner portion 89 is located at the corner portion at which the adapter front wall 82 intersects the adapter bottom wall 84. The corner portion 89 has a terminal placement portion 90 having a recessed shape recessed inward. The circuit substrate 50 is attached to the terminal placement portion 90. A surface of the circuit substrate 50 has a plurality of adapter terminals 521 configured to be in contact with the apparatus-side terminals 721 in the attached state.

As illustrated in FIG. 5, the storage-portion outer shell 408 and the adapter outer shell 409 form a main-body outer shell 405 serving as the outer surfaces of the liquid storage container 4. The main-body outer shell 405 has the front wall 42 located on the front side in the insertion direction D1 in which the liquid storage container 4 is inserted into the container attachment portion 6 and a rear wall 47 located on the side opposite to the front wall 42. The front wall 42 includes the storage-portion front wall 432 and the adapter front wall 82. The rear wall 47 includes the storage-portion rear wall 437 and the adapter rear wall 87.

As illustrated in FIG. 5, the rear wall 47 has a color identification information portion LB for identifying the color of the liquid stored in the liquid storage portion 401. The color identification information portion LB in the present embodiment is formed on the storage-portion rear wall 437 of the rear wall 47. In the present embodiment, the color identification information portion LB is a sticker-like member attached to the storage-portion rear wall 437. The color identification information portion LB has a color indication portion La in the color of the liquid stored in the liquid storage portion 401 and a text portion Lb indicating the color of the liquid stored in the liquid storage portion 401 with text. Here, when the color identification information portions LB of the liquid storage containers 4K, 4Y, 4M, and 4C are distinguished from one another, "LBK", "LBY", "LBM", and "LBC" are used as illustrated in FIG. 2.

As illustrated in FIG. 5, the color indication portion La is a sheet member that serves as the color identification information portion LB and the entirety of which is colored. The color indication portion La enables the user to easily identify the color of the liquid stored in the liquid storage portion 401. Note that in another embodiment, the color indication portion La may be a sheet member having only a part of which is colored. The color of the color indication portion La of the color identification information portion LBK is black. The color of the color indication portion La of the color identification information portion LBY is yellow. The color of the color indication portion La of the color identification information portion LBM is magenta. The color of the color indication portion La of the color identification information portion LBC is cyan. Note that the color of the color indication portion La has only to be substantially the same as the color of the liquid stored in the liquid storage portion 401 and does not have to be identical. For example, the color of the color indication portion La has only to be a color such that the user can identify the color as being substantially the same as the color of the liquid stored in the liquid storage portion 401. In the CIE 1976 L*a*b* color space, the color difference $\Delta E^*_{ab}$ between the color of the color indication portion La and the color of the liquid stored in the liquid storage portion 401 should preferably be 3.0 or less, or more preferably be 1.5 or less. The color of the liquid in the liquid storage portion 401 used in such a determination is based on a result of printing on a printing sheet 2 with the ink, which is a liquid. Specifically, the color of the liquid used in such a determination is based on the values obtained by measuring color in an image depicted on the printing sheet 2 with the liquid by using a color meter.

The printing conditions and the measurement conditions for a method of determining the color of liquid are as follows.

<Printing Conditions>

- The printing sheet 2 is a glossy photo paper sheet available from Seiko Epson Corporation.
- The resolution indicating the number of dots per inch in the X-axis direction is 720 dpi.
- The resolution indicating the number of dots per inch in the Y-axis direction is 720 dpi.
- The coverage ratio indicating the ratio of the area of dots per unit area is 50%.

<Measurement Conditions>

- The color meter is an MCPD-9800 spectrophotometer available from Otsuka Electronics Co., Ltd.
- The light source is D50, and the viewing angle is 2 degrees.

The measurement results expressed in the XYZ color system of the color meter are converted by using a conversion program to derive the values in the L*a*b* color system. The color of the color indication portion La is also measured by using the same color meter and under the same conditions, and the values in the L*a*b* color system are derived in accordance with the measurement results. The color difference $\Delta E^*_{ab}$ is calculated by comparing the derived color of the liquid and the derived color of the color indication portion La.

The text portion Lb is composed of, for example, text including the first letter of an English word expressing the color of the liquid stored in the liquid storage portion 401. The text portion Lb of the color identification information portion LBK has the letters "BK", which are a combination of the first and last letters of the English word "BLACK". The text portion Lb of the color identification information portion LBY has the letter "Y", which is the first letter of the English word "YELLOW". The text portion Lb of the color identification information portion LBM has the letter "M", which is the first letter of the English word "MAGENTA". The text portion Lb of the color identification information portion LBC has the letter "C", which is the first letter of the English word "CYAN". Note that in another embodiment, the text portion Lb may have another letter that replaces or is added to the letter mentioned above. For example, the text portion Lb may include Kanji characters indicating the color of the liquid such as Kanji characters indicating black, yellow, red, or blue in Japanese language. The text portion Lb enables the user to easily identify the color of the liquid stored in the liquid storage portion 401.

As illustrated in FIG. 5, the adapter 402 further includes adapter elements 700. The adapter elements 700 work with attachment-portion elements of the container attachment portion 6 in at least one of an attachment process in which the liquid storage container 4 is being inserted and attached to the container attachment portion 6 and the attached state in which attachment of the liquid storage container 4 to the container attachment portion 6 has been completed.

The adapter elements 700 cooperate mechanically by, for example, coming into contact with or being engaged with the container attachment portion 6 or being inserted into the container attachment portion 6. The adapter elements 700 include an adapter identification member 430, adapter guide portions 447, a supply-portion positioning portion 448, an adapter engagement portion 497, and the circuit substrate 50.

The adapter identification member 430 illustrated in FIG. 5 is located at an end portion of the adapter bottom wall 84 on the front wall 42 side. The adapter identification member 430 includes ribs. The shape of the adapter identification member 430 is determined by the number and the positions of the ribs. The shape is different for each type of the liquid storage container 4, in other words, for each color of the liquid stored in the liquid storage container 4. In the attachment process for attaching the liquid storage container 4, when a correct type of liquid storage container 4 is inserted into the corresponding slot, the adapter identification member 430 passes through the apparatus-side identification member 630 without being interfered by the apparatus-side identification member 630.

As illustrated in FIG. 5, the adapter guide portions 447 extend in the insertion direction D1. In FIG. 5, an adapter guide portion 447 is hatched for easy identification. The adapter guide portions 447 extend in the insertion direction D1 from portions where the corner portion 89 are located to portions where the insertion opening 446 is located. An adapter guide portion 447 is formed on each of the first adapter side wall 85 and the second adapter side wall 86. The adapter guide portions 447 are guided in the insertion direction D1 by the apparatus guide portions 602 of the container attachment portion 6.

The adapter guide portion 447 is composed of a step. In other words, regarding the width of the adapter outer shell 409, a portion including the adapter bottom wall 84 is narrower than the other portion farther away from the adapter bottom wall 84 than the portion including the adapter bottom wall 84. This configuration forms the steps of the adapter guide portions 447. The adapter guide portions 447 are surfaces facing the −Z direction.

In the process in which the liquid storage container 4 is being inserted into the container attachment portion 6, the adapter guide portions 447 are in contact with the surfaces of the apparatus guide portions 602 on the +Z direction side, and thus the movement of the liquid storage container 4 in the insertion direction D1 is guided with the orientation of the liquid storage container 4 kept constant.

The supply-portion positioning portion 448 illustrated in FIG. 5 receives the apparatus-side positioning portion 644 in the attachment process to position the liquid supply portion 442 relative to the liquid introduction portion 642. Specifically, the supply-portion positioning portion 448 receives the apparatus-side positioning portion 644 in the attachment process and restricts the movement of the supply-portion positioning portion 448 in the directions intersecting the rotatory attachment direction D2 to position the liquid supply portion 442 relative to the liquid introduction portion 642. The supply-portion positioning portion 448 is a recess formed in the adapter bottom wall 84 and is recessed from the outer surface of the adapter bottom wall 84. The supply-portion positioning portion 448 is located at a position on the adapter bottom wall 84 between the insertion opening 446 and the end portion to which the adapter front wall 82 is coupled. Note that the supply-portion positioning portion 448 has only to have a recessed shape and hence may be a hole extending through the adapter bottom wall 84.

Figure 6:
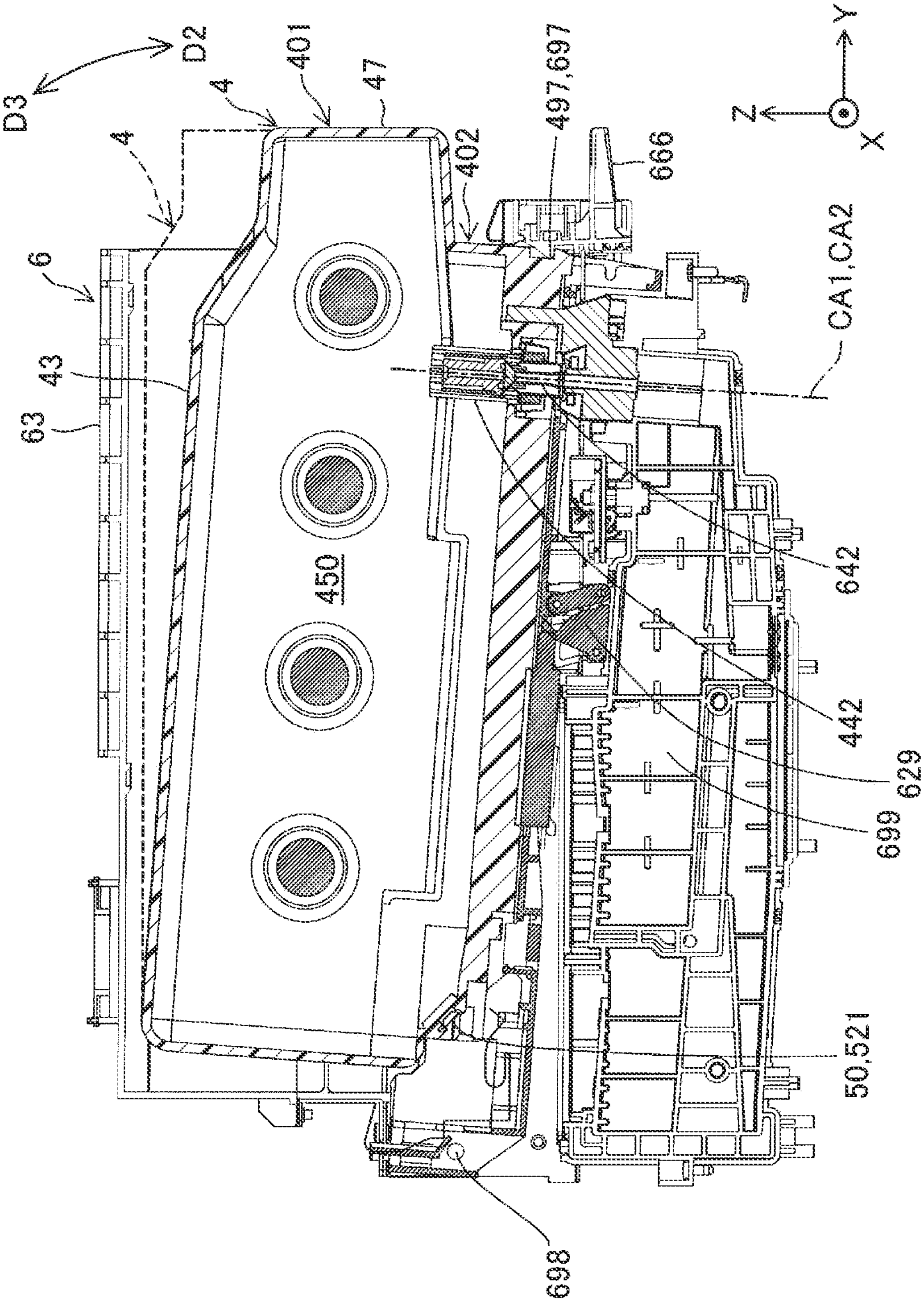
FIG. 6 is a cross-sectional view of the liquid storage container attached to the container attachment portion in an attached state.

The adapter engagement portion 497 illustrated in FIG. 5 is located on the adapter rear wall 87. The adapter engagement portion 497 is a recess recessed from the outer surface of the adapter rear wall 87. The adapter engagement portion 497 is formed at a position on the adapter rear wall 87 near the end portion at which the adapter rear wall 87 intersects the adapter bottom wall 84. As illustrated in FIG. 6 described later, when an attachment engagement portion 697 enters the adapter engagement portion 497 in the attached state, the adapter engagement portion 497 engages the attachment engagement portion 697. This engagement maintains the liquid storage container 4 in the attached state relative to the container attachment portion 6.

The circuit substrate 50 illustrated in FIG. 4 is located in the terminal placement portion 90 provided in the adapter 402. The circuit substrate 50 has the adapter terminals 521 configured to be in contact with the apparatus-side terminals 721 in the attached state.

The storage-portion outer shell 408 has a first-type color in a degree that does not allow light including ultraviolet or visible light to pass through the storage-portion outer shell 408. The light mentioned above includes at least natural light or artificial light, such as illumination. The adapter outer shell 409 has a second-type color having a color difference with respect to the color of the stored liquid larger than or equal to a threshold. A degree that does not allow light to pass through corresponds to a total light transmittance specified in JIS K7375:2008 of 10% or less. Note that the total light transmittance of the storage-portion outer shell 408 has only to be 10% or less but should more preferably be 5% or less. In the present embodiment, the storage-portion outer shells 408 of the liquid storage containers 4K, 4Y, 4M, and 4C have the same color, which is black. Note that the storage-portion outer shells 408 of the liquid storage containers 4K, 4Y, 4M, and 4C may have achromatic colors or chromatic colors. When ideal white is defined as 100 and ideal black is defined as 0, the lightness L* of the storage-portion outer shells 408 of the liquid storage containers 4K, 4Y, 4M, and 4C should preferably be 30 or less, more preferably be 15 or less, or further preferably be 5 or less. With this configuration, the storage-portion outer shell 408 has a property such that light is less likely to pass through the storage-portion outer shell 408.

The adapter outer shell 409 has a second-type color having a color difference $\Delta E^*_{ab}$ with respect to the color of the liquid stored in the liquid storage portion 401 larger than or equal to a threshold. The threshold is set to a value of a degree such that when the liquid in the liquid storage portion 401 is attached to the adapter outer shell 409, the user can easily notice the attached liquid. The threshold should preferably be set to, for example, a value larger than or equal to 12, more preferably be set to a value larger than or equal to 20, or further preferably be set to a value larger than or equal to 30. In the present embodiment, the adapter outer shells 409 of the liquid storage containers 4K, 4Y, 4M, and 4C have the same color. The adapter outer shells 409 may have achromatic colors or chromatic colors. In the present embodiment, the adapter outer shells 409 have an achromatic color, which is white or gray. The lightness L* of the adapter outer shell 409 of each liquid storage container 4K, 4Y, 4M, or 4C is higher than the lightness L* of the corresponding storage-portion outer shell 408. For example, when ideal white is defined as 100 and ideal black is defined as 0, the lightness L* of the adapter outer shells 409 of the liquid storage containers 4K, 4Y, 4M, and 4C should preferably be 70 or more, more preferably be 85 or more, or further preferably be 95 or more. Since the lightness L* of the adapter outer shell 409 is higher than the lightness L* of the storage-portion outer shell 408, in the case in which ink is attached to the adapter outer shell 409, the user can notice the attached ink more easily than when the lightness L* of the adapter outer shell 409 is lower than or equal to the lightness L* of the storage-portion outer shell 408. In addition, when the lightness L* of the adapter outer shell 409 is higher, in the case in which a cyan ink, a magenta ink, a yellow ink, or a black ink whose lightness L* is lower than or equal to a certain degree, for example, 40, is attached to the adapter outer shell 409, the user can easily notice the attached ink.

As described above, regarding the liquid storage container set 4S including the plurality of liquid storage containers 4K, 4Y, 4M, and 4C, the first-type color of the storage-portion outer shell 408 is the same for all the plurality of liquid storage containers 4K, 4Y, 4M, and 4C regardless of the color of the liquid stored in each of the liquid storage containers 4K, 4Y, 4M, and 4C. With this configuration, for example, the liquid storage portions 401 of the plurality of liquid storage containers 4K, 4Y, 4M, and 4C can be manufactured by using the same material, which reduces the production cost of the liquid storage portions 401. In addition, regarding the liquid storage container set 4S, the second-type color of the adapter outer shell 409 is the same for all the plurality of liquid storage containers 4K, 4Y, 4M, and 4C regardless of the color of the liquid stored in each of the liquid storage containers 4K, 4Y, 4M, and 4C. With this configuration, for example, the adapters 402 of the plurality of liquid storage containers 4K, 4Y, 4M, and 4C can be manufactured by using the same material, which reduces the production cost of the adapters 402.

A-4. Attachment Process for Attaching Liquid Storage Container to Container Attachment Portion and Attached State FIG. 6 is a cross-sectional view of a liquid storage container 4 attached to the container attachment portion 6 in the attached state. The attachment process for the liquid storage container 4 and the attached state will be described with reference to FIG. 6. When the liquid storage container 4 is attached to the container attachment portion 6, first the liquid storage container 4 is moved in the insertion direction D1 with the storage-portion upper wall 43 level and inserted into the container attachment portion 6. When the insertion into the container attachment portion 6 has been completed, the liquid storage container 4 is in the state as illustrated by dotted lines illustrating part of the liquid storage container 4, and the adapter terminals 521 of the circuit substrate 50 are in contact with the apparatus-side terminals 721 (not illustrated). Next, the rear wall 47 side of the liquid storage container 4 is pushed down to rotate the liquid storage container 4 around the rotation axis 698 so that the liquid storage container 4 is moved in the rotatory attachment direction D2. With this operation, the liquid storage container 4 is placed into the attached state in which the liquid storage container 4 is attached to the container attachment portion 6. In the attached state, the liquid supplied from the liquid supply portion 442 of the liquid storage container 4 to the liquid introduction portion 642 is reserved in a liquid reservoir 699 of the container attachment portion 6. The inside of the liquid reservoir 699 is kept at a predetermined pressure.

The liquid introduction portion 642 contains an inlet valve mechanism configured to open and close the flow path in the liquid introduction portion 642. The inlet valve mechanism is closed when the liquid introduction portion 642 is not coupled to the liquid supply portion 442. When the liquid introduction portion 642 is inserted into the liquid supply portion 442, a valve mechanism of the liquid supply portion 442 and the inlet valve mechanism open.

In the embodiment described above, since the storage-portion outer shell 408 has the first-type color in a degree that does not allow light to pass through the storage-portion outer shell 408, the degree to which light passes through the storage-portion outer shell 408 can be set low, which reduces the possibility of light such as natural light and illumination light degrading the liquid in the liquid storage portion 401. In addition, since the adapter outer shell 409 has the second-type color having a color difference with respect to the color of the liquid in the liquid storage portion 401 larger than or equal to a threshold, when the liquid in the liquid storage portion 401 is attached to the adapter, the user can easily notice the attached liquid. Hence, the user can promptly wipe off the liquid attached to the adapter 402. This configuration makes it possible to reduce the possibility of the liquid staining the user and other objects.

In particular, when the liquid is a pigment ink, and the pigment ink attached to the adapter 402 is neglected, the water component evaporates, and the pigment ink solidifies in some cases. In this case, the possibility of the solidification of ink hindering the cooperation between the adapter elements 700 and the attachment-portion elements increases. Since the configuration in the embodiment described above makes it possible to prevent the state in which the liquid is attached to the adapter elements 700, the possibility of the cooperation between the attachment-portion elements such as the apparatus guide portions 602 and the adapter elements 700 being hindered decreases. For example, it is possible to reduce the possibility of attached liquid hindering the adapter guide portions 447 from being guided by the container attachment portion 6 in the attachment process. In addition, for example, it is possible to reduce the possibility of the cooperation between the supply-portion positioning portion 448 and the apparatus-side positioning portion 644 being hindered in the attachment process. The above reduces the possibility of the supply-portion positioning portion 448 being hindered from positioning the liquid supply portion 442. In addition, for example, since it is possible to prevent the liquid from attaching to the adapter terminals 521 or prevent the state in which the liquid is attached to the adapter terminals 521 from continuing, the above reduces the possibility of the contact between the adapter terminals 521 and the apparatus-side terminal portion 70 being hindered.

In the embodiment described above, the rear wall 47 of the liquid storage container 4 has the color identification information portion LB. With this configuration, when the user cannot see inside the liquid storage portion 401, the user can still easily identify the color of the liquid stored in the liquid storage portion 401. Hence, it is possible to prevent a liquid storage container 4 storing an ink of a color different from the color that should be originally stored from being attached to the container attachment portion 6.

B. Other Embodiments

B-1. Another Embodiment 1

Although the color of the storage-portion outer shells 408 is the same, and the color of the adapter outer shell 409 is the same for each of the liquid storage containers 4K, 4C, 4M, and 4Y in the embodiment described above, these colors may be different for each of the liquid storage containers 4K, 4C, 4M, and 4Y.

B-2. Another Embodiment 2

Although the liquid storage containers 4 store ink in the embodiment described above, the liquid storage containers 4 may store another kind of liquid. Examples of liquid include coloring materials used for manufacturing color filters for image display devices such as liquid crystal displays and electrode materials used for forming electrodes of organic electro luminescence (EL) displays, field emission displays (FEDs), and the like.

C. Other Aspects

The present disclosure is not limited to the foregoing embodiments and can be implemented in various aspects within a scope not departing from the spirit. For example, the present disclosure may be implemented in the following aspects. The technical features in the foregoing embodiments corresponding to the technical features of the aspects written below can be replaced or combined as appropriate to solve some or all of the issues of the present disclosure or to achieve some of all of the effects of the present disclosure. Unless technical features are explained as essential ones in the present specification, they can be omitted as appropriate.

(1) A first aspect of the present disclosure provides a liquid storage container configured to be detachably attached to a container attachment portion of a printing apparatus. The liquid storage container includes: a liquid storage portion including a storage-portion outer shell for storing liquid inside; and an adapter including an adapter outer shell and an insertion opening that is formed in the adapter outer shell and into which a liquid introduction portion of the container attachment portion is inserted, the storage-portion outer shell has a first-type color in a degree that does not allow light to pass through the storage-portion outer shell, and the adapter outer shell has a second-type color having a color difference with respect to a color of the liquid larger than or equal to a threshold. With this configuration, since the storage-portion outer shell has the first-type color, the degree to which light passes through the storage-portion outer shell can be set low, which reduces the possibility of light such as natural light and illumination light degrading the liquid in the liquid storage portion. In addition, since the adapter outer shell has the second-type color, when the liquid in the liquid storage portion is attached to the adapter, the user can easily notice the attached liquid.

(2) In the liquid storage container according to the above aspect, lightness of the adapter outer shell may be higher than lightness of the storage-portion outer shell. With this configuration, when the liquid in the liquid storage portion is attached to the adapter, the user can notice the attached liquid more easily.

(3) In the liquid storage container according to the above aspect, the storage-portion outer shell and the adapter outer shell may form a main-body outer shell of the liquid storage container, the main-body outer shell may include a front wall located on a front side in an insertion direction in which the liquid storage container is inserted into the container attachment portion and a rear wall located on a side opposite to the front wall, and the rear wall may include a color identification information portion configured to indicate the color of the liquid to be stored in the liquid storage portion. With this configuration, the color identification information portion enables the user to easily identify the color of the liquid stored in the liquid storage portion. Hence, it is possible to prevent a liquid storage container storing a liquid of a color different from the color that should be originally stored from being attached to the container attachment portion.

(4) In the above aspect, the color identification information portion may include a color indication portion in the color of the liquid to be stored in the liquid storage portion. With this configuration, the color indication portion enables the user to identify the color of the liquid stored in the liquid storage portion more easily.

(5) In the above aspect, the color identification information portion may include a text portion indicating the color of the liquid to be stored in the liquid storage portion with text. With this configuration, the text portion enables the user to identify the color of the liquid stored in the liquid storage portion more easily.

(6) In the above aspect, the adapter may further include an adapter element configured to work together with an attachment-portion element of the container attachment portion in at least one of an attachment process for attaching the liquid storage container to the container attachment portion and an attached state in which the liquid storage container is attached to the container attachment portion. With this configuration, when the liquid is attached to the adapter, the user can easily notice the attached liquid. Since this configuration enables the user to wipe off the liquid attached to the adapter, it is possible to reduce the possibility of the cooperation between the attachment-portion element and the adapter element being hindered.

(7) In the above aspect, the adapter outer shell may include an adapter bottom wall having the insertion opening, and an adapter side wall intersecting the adapter bottom wall and extending in an insertion direction in which the liquid storage container is inserted into the container attachment portion, and the adapter element may include an adapter guide portion extending on the adapter side wall in the insertion direction and configured to be guided in the insertion direction by the container attachment portion. With this configuration, since the liquid attached to the adapter is wiped off by the user, it is possible to reduce the possibility of the attached liquid hindering the adapter guide portion from being guided by the container attachment portion.

(8) In the above aspect, the adapter outer shell may include an adapter bottom wall having the insertion opening, the liquid storage container may include a liquid supply portion communicating with an inside of the liquid storage portion and configured to be coupled to the liquid introduction portion, and the adapter element may include a supply-portion positioning portion having a recessed shape formed in the adapter bottom wall, the supply-portion positioning portion being configured to receive an apparatus-side positioning portion of the container attachment portion to position the liquid supply portion. With this configuration, since the liquid attached to the adapter is wiped off by the user, it is possible to reduce the possibility of the attached liquid hindering the supply-portion positioning portion from positioning the liquid supply portion.

(9) In the above aspect, the adapter element may include a circuit substrate attached to the adapter and having an adapter terminal configured to be in contact with an apparatus-side terminal of the container attachment portion in the attached state. With this configuration, since the liquid attached to the adapter is wiped off by the user, it is possible to reduce the possibility of the attached liquid hindering the contact between the adapter terminal and the apparatus-side terminal.

(10) A second aspect of the present disclosure provides a liquid storage container set including a plurality of liquid storage containers. Each of the liquid storage containers is configured to be detachably attached to a container attachment portion of a printing apparatus. Each of the liquid storage containers includes a liquid storage portion including a storage-portion outer shell for storing liquid inside and an adapter including an adapter outer shell and an insertion opening that is formed in the adapter outer shell and into which a liquid introduction portion of the container attachment portion is inserted, the storage-portion outer shell has a first-type color in a degree that does not allow light to pass through the storage-portion outer shell, the adapter outer shell has a second-type color having a color difference with respect to a color of the liquid larger than or equal to a threshold, and the first-type color is a same color for each of the liquid storage containers regardless of the color of the liquid to be stored in each of the liquid storage containers. This configuration makes it possible to reduce the production cost of the liquid storage portion.

(11) In the above aspect, the second-type color may be a same color for each of the liquid storage containers regardless of the color of the liquid to be stored in each of the liquid storage containers. This configuration makes it possible to reduce the production cost of the adapter.

The present disclosure can also be implemented in various aspects other than the above ones. For example, the present disclosure may be implemented as aspects such as a method of manufacturing a liquid storage container or a liquid storage container set and a printing system including a printing apparatus and a liquid storage container.

What is claimed is:

1. A liquid storage container configured to be detachably attached to a container attachment portion of a printing apparatus, comprising:

a liquid storage portion including a storage-portion outer shell for storing liquid inside; and an adapter including an adapter outer shell and an insertion opening that is formed in the adapter outer shell and into which a liquid introduction portion of the container attachment portion is inserted, wherein the storage-portion outer shell has a first-type color in a degree that does not allow light to pass through the storage-portion outer shell, and the adapter outer shell has a second-type color having a color difference with respect to a color of the liquid larger than or equal to 12.

2. The liquid storage container according to claim 1, wherein lightness of the adapter outer shell is higher than lightness of the storage-portion outer shell.

3. The liquid storage container according to claim 1, wherein the storage-portion outer shell and the adapter outer shell form a main-body outer shell of the liquid storage container, the main-body outer shell includes a front wall located on a front side in an insertion direction in which the liquid storage container is inserted into the container attachment portion and a rear wall located on a side opposite to the front wall, and the rear wall includes a color identification information portion configured to indicate the color of the liquid to be stored in the liquid storage portion.

4. The liquid storage container according to claim 3, wherein the color identification information portion includes a color indication portion in the color of the liquid to be stored in the liquid storage portion.

5. The liquid storage container according to claim 3, wherein the color identification information portion includes a text portion indicating the color of the liquid to be stored in the liquid storage portion with text.

6. The liquid storage container according to claim 1, wherein the adapter further includes an adapter element configured to work together with an attachment-portion element of the container attachment portion in at least one of an attachment process for attaching the liquid storage container to the container attachment portion and an attached state in which the liquid storage container is attached to the container attachment portion.

7. The liquid storage container according to claim 6, wherein the adapter outer shell includes an adapter bottom wall having the insertion opening, and an adapter side wall intersecting the adapter bottom wall and extending in an insertion direction in which the liquid storage container is inserted into the container attachment portion, and the adapter element includes an adapter guide portion extending on the adapter side wall in the insertion direction and configured to be guided in the insertion direction by the container attachment portion.

8. The liquid storage container according to claim 6, wherein the adapter outer shell includes an adapter bottom wall having the insertion opening, the liquid storage container includes a liquid supply portion communicating with an inside of the liquid storage portion and configured to be coupled to the liquid introduction portion, and the adapter element includes a supply-portion positioning portion having a recessed shape formed in the adapter bottom wall, the supply-portion positioning portion being configured to receive an apparatus-side positioning portion of the container attachment portion to position the liquid supply portion.

9. The liquid storage container according to claim 6, wherein the adapter element includes a circuit substrate attached to the adapter and having an adapter terminal configured to be in contact with an apparatus-side terminal of the container attachment portion in the attached state.

10. A liquid storage container set including a plurality of liquid storage containers, wherein each of the liquid storage containers is configured to be detachably attached to a container attachment portion of a printing apparatus, each of the liquid storage containers includes a liquid storage portion including a storage-portion outer shell for storing liquid inside and an adapter including an adapter outer shell and an insertion opening that is formed in the adapter outer shell and into which a liquid introduction portion of the container attachment portion is inserted, the storage-portion outer shell has a first-type color in a degree that does not allow light to pass through the storage-portion outer shell, the adapter outer shell has a second-type color having a color difference with respect to a color of the liquid larger than or equal to 12, and the first-type color is a same color for each of the liquid storage containers regardless of the color of the liquid to be stored in each of the liquid storage containers.

11. The liquid storage container set according to claim 10, wherein the second-type color is a same color for each of the liquid storage containers regardless of the color of the liquid to be stored in each of the liquid storage containers.

* * * * *